United States Patent
Bocian

[19]

[11] Patent Number: 6,079,770
[45] Date of Patent: Jun. 27, 2000

[54] TRUCK WASTE SYSTEM

[75] Inventor: Byron J. Bocian, Portland, Oreg.

[73] Assignee: Freightliner Corporation, Portland, Oreg.

[21] Appl. No.: 09/024,251

[22] Filed: Feb. 17, 1998

[51] Int. Cl.[7] .................................................. B60R 11/00
[52] U.S. Cl. .................................... 296/190.01; 296/24.1; 296/190.11
[58] Field of Search ..................... 396/190.01, 190.02, 396/190.11, 24.1, 156, 168, 164

[56] References Cited

U.S. PATENT DOCUMENTS

| | | | |
|---|---|---|---|
| 4,436,177 | 3/1984 | Elliston | 296/190.02 |
| 4,550,946 | 11/1985 | Hanemaayer | 296/24.1 |
| 4,917,430 | 4/1990 | Lawrence | 296/190.11 |
| 4,961,607 | 10/1990 | Marshall, Sr. | 296/24.1 |

FOREIGN PATENT DOCUMENTS 83645   4/1983   Italy ...................................... 296/156

OTHER PUBLICATIONS

Vagabond toillets, Capital Supply, RV Parts and Accessories, p. 320, 1997.

*Primary Examiner*—Dennis H. Pedder
*Attorney, Agent, or Firm*—Klarquist Sparkman Campbell Leigh & Whinston LLP

[57] ABSTRACT

A truck waste system includes a chemical toilet carried by a support which is slidable between first, second and third positions. In the first position, the toilet is stored within a cabinet in the interior of a truck. When in the second position, the support and thus the toilet coupled to the support is slid outwardly from the cabinet toward the interior of the cab for easy accessibilty and use. In the third or cleaning position, the support that carries the toilet is slid in an opposite direction through an exterior wall passageway of the truck to a location outside of the cab where the toilet may be readily accessed for cleaning.

22 Claims, 3 Drawing Sheets

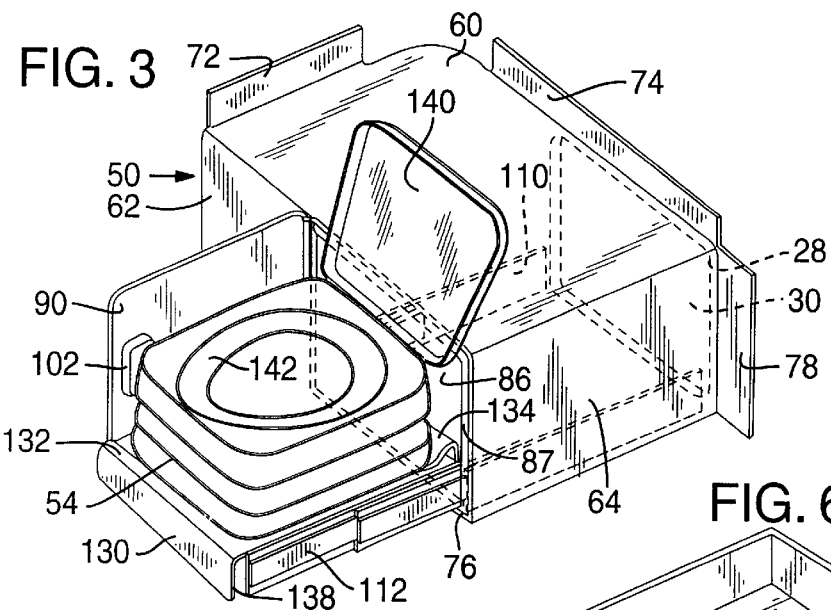
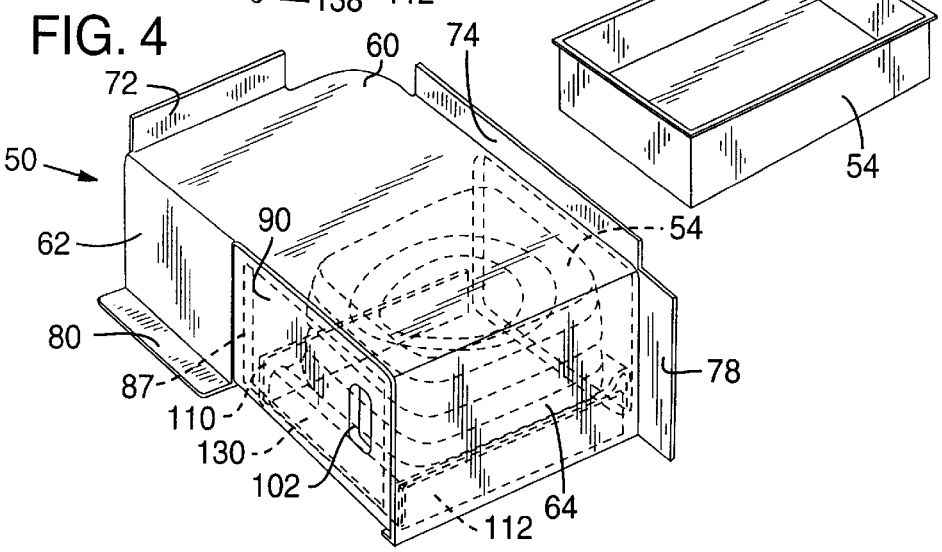
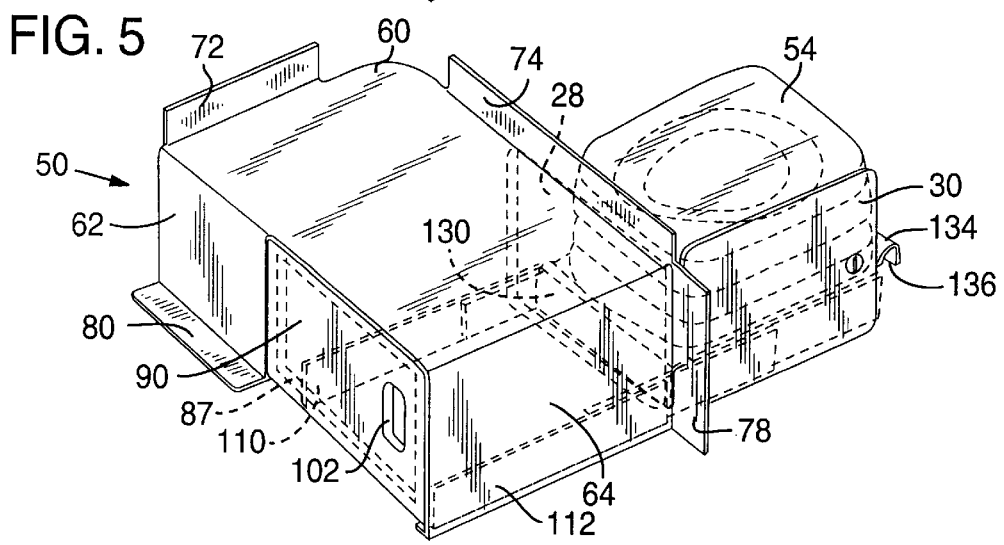

TRUCK WASTE SYSTEM

The present invention relates to a system included in a truck for handling human and other waste and, more specifically, relates to an easily accessible and readily cleanable toilet system in a truck.

BACKGROUND

Portable chemical toilets are well known and have been used by people on camping or other trips for collecting human waste. These toilets are typically cleaned by taking them to a permanent toilet fixture or sewage receiving location, dumping them, and cleaning them at such locations. As these toilets are being moved, it is possible for their contents to spill and contaminate the location of the spill with waste. Not only can these spills cause stains, they are unsanitary and would require disinfectant to sanitize the area of the spill.

Recreational vehicles are also known to have toilets inside the vehicle. When a recreational vehicle is parked, a hose is typically connected from a sewage delivery outlet of the recreational vehicle, which receives sewage from the toilet, into a sewage receiving line.

Long distance trucks are now being manufactured with extended cabs which are furnished with beds, sinks and other amenities to make them more usable for long distance hauling operations. These cabs are known to have benches or bunks positioned along an exterior wall of the cab. In some cases, the area under the bunk is a storage area which is accessible through a doorway passing through an exterior wall of the cab for use in storing flares or tools. These trucks are often driven at night in remote areas. Consequently, it can be a safety concern for both male and female drivers should they have to leave their trucks to go to a bathroom at a remote truck stop. In such cases, it would be far safer to have a toilet in the truck which is available for use. Yet, the inclusion of a conventional chemical toilet inside a truck raises the issue of possibly spilling the contents of the toilet, particularly when the toilet is carried through the cab area and out through the driver's side or passenger side door of the truck. The risk of spilling such a toilet is increased by the fact that truck passenger and driver's side doors are typically relatively high off the ground, making it necessary for a driver to climb out on steps as the driver descends from the truck. The possibility of a driver falling as the driver exits the truck is increased to the extent the driver's hands are carrying a toilet and are not available to grab onto handles and the like when the driver descends from the truck.

Therefore, a need exists for a truck waste system designed to overcome these and other problems of the prior art.

SUMMARY OF THE INVENTION

A truck cab has a cab interior with a cabinet positioned within the cab interior and defining an interior cabinet space. The cabinet has a doorway or opening which communicates from the interior cabinet space to portions of the cab interior outside of the cabinet. A toilet, such as a portable chemical toilet, may be placed in the interior cabinet space and is accessible through the doorway for use. More specifically, the toilet is typically shifted through the doorway and into the cab interior for use and returned through the doorway to the interior of the cabinet for storage. The cabinet most preferably has a door which is operable to selectively open and close the doorway. A gasket or other seal may be used to hermetically seal the doorway when the door is closed to minimize the transfer of odors from the toilet to the cab interior outside the cabinet.

Most preferably, the cabinet is located along an exterior wall of the truck. A passageway is provided through the exterior wall so as to communicate between the interior cabinet space and the exterior of the truck. This wall passageway is preferably closed by a door when access to the passageway is not required. The toilet is thus accessible through the wall passageway for cleaning purposes. That is, one need not remove the toilet from the cabinet and travel through the cab interior and out the driver's side or passenger's side door in order to clean the toilet.

In a specifically preferred form of the invention, the toilet is slidable between first, second and third positions and most preferably is mounted to a sliding support for movement between these positions as the support is moved. When in the first position, the toilet is stored within the cabinet. When in the second position, the toilet extends outwardly through the doorway and into the interior of the cab sufficiently to allow use of the toilet. When in the third position, the toilet is at least partially outside the exterior of the truck where it can be readily accessed, and temporarily removed if required, for cleaning. In a specifically illustrated embodiment of the invention, the toilet is portable and is carried by the support which slides relative to the cabinet and cab to selectively position the toilet in the first, second and third positions.

The support is most preferably slidably coupled to either the interior of the cabinet or the cab, such as to the floor of the cab. In a specifically preferred form, parallel spaced apart double acting slides are coupled to the support. A toilet carried by the support is movable with the support in opposed first and second directions to thereby shift the toilet between the first, second and third positions.

The toilet may comprise a toilet for human waste or, alternatively, may comprise a toilet for animal waste, such as a litter box. In either case, the toilet is readily available for use by simply sliding it from a stored position in the cabinet to a second position within the interior of the cab. Moreover, in the embodiment wherein a passageway is provided through the exterior wall, cleaning of the toilet is facilitated, as the toilet may be shifted to the third or cleaning position through the wall passageway.

It is accordingly an object of the invention to provide an improved truck waste system.

These and other objects, features and advantages of the present invention will become apparent with reference to the following description and drawings.

BRIEF DESCRIPTION OF THE DRAWINGS

FIGS. 3, 4 and 5 illustrate the toilet being shifted between a respective first or stored position, a second position within the interior of the cab where it is accessible for use, and a third position wherein the toilet is positioned exteriorly of the cab for access for cleaning purposes. FIGS. 2–5 also show an optional seal for sealing a toilet cabinet door. FIG. 6 shows a form of a conventional animal litter box which may be used as the toilet.

DETAILED DESCRIPTION OF PREFERRED EMBODIMENT

Figure 1:
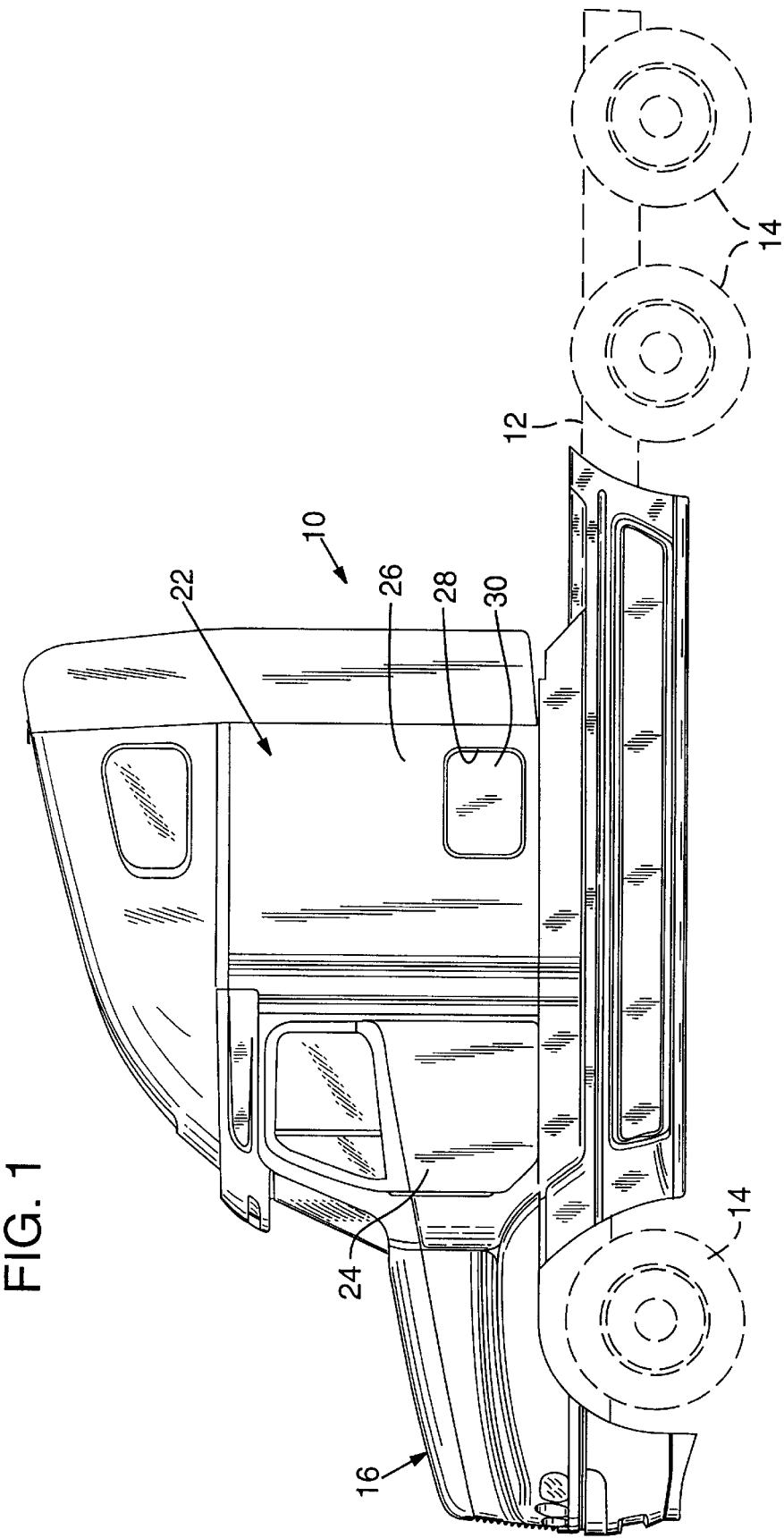
FIG. 1 is a side elevation view of a truck showing an exterior wall of the truck through which a wall passageway covered by a door is provided.

FIG. 1 illustrates one form of a truck 10 having a frame 12 supported by a plurality of wheels 14 and having an engine within a front engine compartment 16 for driving at least some of the wheels. A cab 22 is mounted to the frame. The illustrated cab 22 is an extended cab in that a living space is provided in the cab interior rearwardly of the doors 24. The cab 22 has an exterior wall 26 through which a wall passageway 28 is provided. A door 30 is pivoted or otherwise supported by wall 26. The door 30 is selectively movable between positions in which the wall passageway 28 is open, providing access through the wall 26, and the position shown in FIG. 1 wherein the door 30 is closed. The door 30 may be provided with a handle and lock (not shown in FIG. 1).

Figure 2:
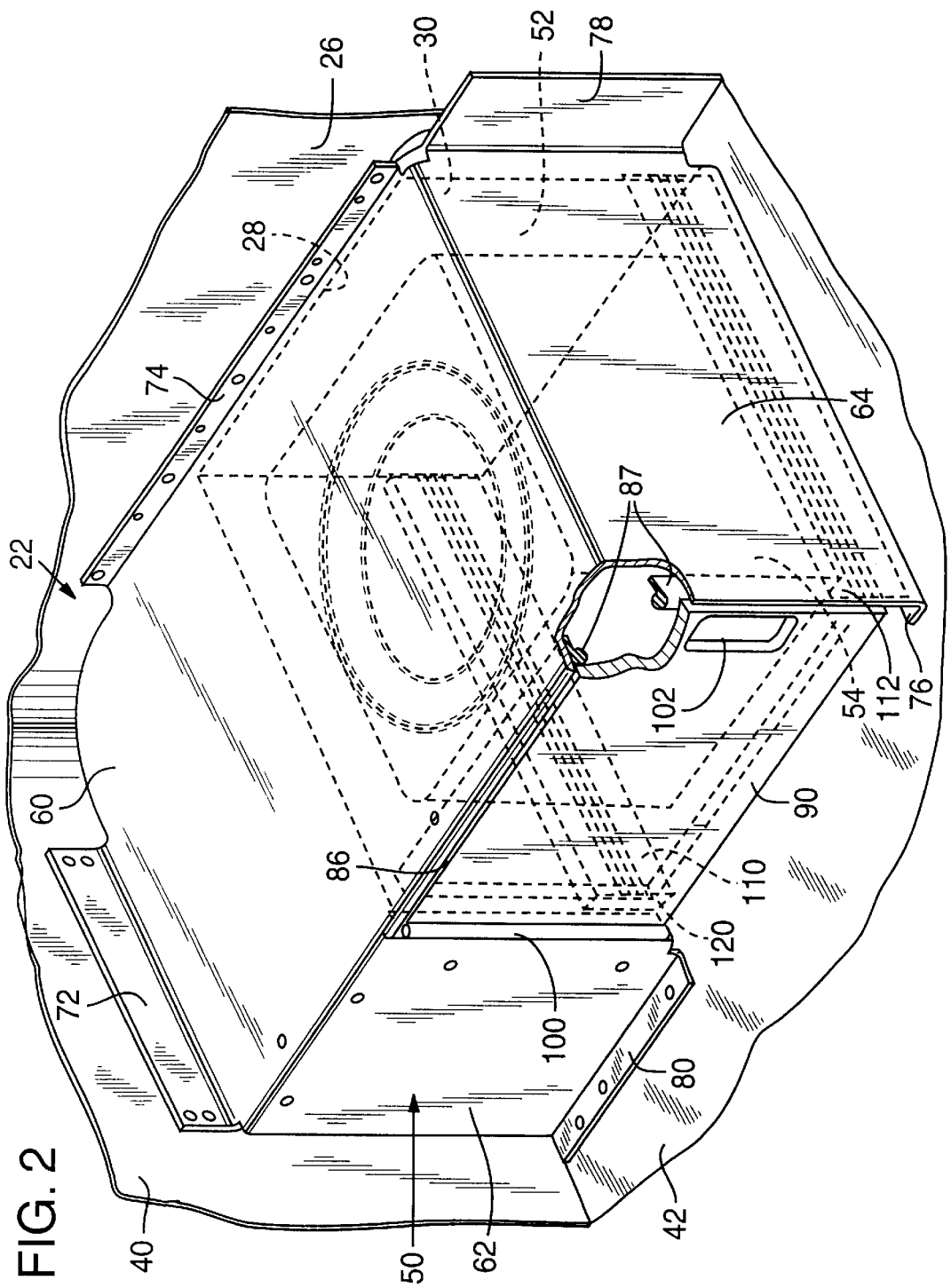
FIG. 2 is a perspective view of one embodiment of the present invention illustrating a cabinet with a toilet positioned therein, the toilet being shown in dashed lines in this figure.

With reference to FIG. 2, a portion of the interior of the cab 22 is shown. More specifically, in FIG. 2, the sidewall 26 and a portion of the rear wall 40 for the cab 22 are shown, along with a portion of the cab floor 42.

A cabinet 50 is shown within the interior of the cab 22. The illustrated cabinet 50 includes a hollow interior space 52 within which a toilet 54, such as a portable chemical toilet may be positioned. Although any form of toilet may be used, a Model No. 735 chemical toilet from the Thetford Company of Brea, Calif. is one specific example. The cabinet 50 may also take any convenient form which provides a housing for the toilet 54.

In the illustrated form, cabinet 50 comprises a bench seat or bunk support having a top panel 60, a front panel 62 and an end panel 64. In this configuration, the truck cab panels 26 and 40 form respective rear and opposite end surface walls of the cabinet. The cabinet 50 may be formed by bending or stamping sheet metal, or in any convenient manner. As can be seen in FIG. 2, the illustrated cabinet 50 includes first and second upright flanges 72, 74 projecting upwardly from panel 60 for connection respectively to the cab rear wall 40 and the cab side wall 26. In addition, panel 64 includes an inwardly extending lower modular flange 76 extending from front to back of the panel 64 for use in connecting the panel 64 to the floor 42 of the cab. The panel 64 also includes an upright mounting flange 78 along the rear edge of the panel for connection to the cab side wall 26. The panel 62 includes a lower outwardly projecting floor mounting flange 80 along its lower edge for connection to the floor 42.

A doorway or opening 86 is provided through the front of the cabinet and communicates between the interior cabinet space 52 and the portions of the cab interior which are outside the cabinet. A door 90 is mounted to the cabinet, such as by a hinge (not shown in FIG. 2) coupling the door to an inwardly turned flange 100 which extends vertically along the edge of panel 62 closest to the panel 64. The door 90 includes a handle 102 which may be gripped to open or close the door. The entire periphery of the door opening 86 may be bounded by an optional gasket or seal, such as a soft Neoprene rubber strip, with a conventional bulb seal from Mantaline of Ohio being a specifically preferred example. An example seal is indicated at 87 in FIGS. 2–5. Consequently, when the door is in a closed position as shown in FIG. 2, the gasket provides a hermetic seal between the portions of the cab interior outside the cabinet and the interior of the cabinet. This minimizes the possible passage of odors from the toilet to the portions of the cab interior outside of the cabinet when the door is closed.

When door 90 is open, the toilet 54 may be shifted through the doorway 86 to a first position where it is accessible to someone in the cab. In a less preferred approach, an access opening may be provided through panel 60 for access to the toilet for use. When the toilet is shifted to its accessible position in the illustrated embodiment, it may conveniently be used by someone located in the cab interior of the truck. Thereafter, the toilet may be returned to its first or stored position within the interior space 52 of the cabinet 50. In the embodiment shown in FIG. 2, the wall passageway 28 is positioned opposite to the doorway 86 and communicates between the exterior cab and interior cabinet space 52 when the door 30 is opened. Consequently, door 30 may be opened and the toilet 54 shifted to a third position exteriorly of the cab where it may be readily cleaned, or removed for cleaning, as required.

In a specifically preferred form of the invention, the toilet 54 is slidably coupled to the cabinet and/or the cab, for example to the floor of the cab, for sliding motion between the first, second and third positions. Schematically illustrated in FIG. 2 are a pair of side-by-side parallel spaced apart slides 110, 112 for coupling the toilet 54 to the cabinet and/or cab for relative sliding motion of these elements. Preferably, the slides 110, 112 comprise commercially available double acting drawer slides having a sufficient capacity for use in this application, such as a 300 pound capacity. Alternatively, in another form, the mechanisms 110, 112 may each comprise a pair of single acting slides which are interconnected. In this case, one slide permits the sliding movement of the toilet in a first direction toward the interior of the cab and the other slide permits the sliding movement of the toilet in the opposite direction, toward the exterior of the cab. In FIG. 2, slide 112 is mounted to a slide support (not shown), which is connected to the interior surface of cabinet panel 64 and may also be connected to the floor 42. In addition, slide 110 is mounted to a slide support 120 which may be mounted to the floor 42 or, alternatively, mounted to panel 62 and wall 26. Also, an interior upright cabinet wall may be provided at this location to which the slide 110 may be mounted.

As best seen in FIG. 3, in a specifically preferred embodiment, a support 130 is provided and slidable relative to the cabinet and cab. In FIG. 3, the support 130 is shown coupled to the slides 110, 112 for sliding with the movement of the slides. In addition, the toilet 54 is loosely nested into the upper surface of the support. The support 130 has a front lip portion 132 which prevents the toilet from sliding forwardly relative to the support and a rear lip portion 134 which minimizes a risk of the toilet sliding rearwardly off of the support. As can be seen in FIG. 5, the rear lip portion 134 is undercut at 136 to form a handle which may readily be grasped to pull the support and, thus, the toilet, rearwardly through the wall opening 28 for ready access for cleaning purposes. The handle 136 may be formed in any convenient manner.

In operation, assuming one desires to use the toilet, the door 90 is shifted (see FIG. 3) to an open position thereby opening the doorway 86. The support 130 is grabbed and pulled in a first direction toward the interior of the cab and outwardly from the interior of the cabinet space. The front lip 132 of support 130 has a handle, for example it may be undercut, such as at 138, to provide a handle for convenient use in grabbing and sliding the support. When in the position (the second position) shown in FIG. 3, the illustrated toilet has a lid 140 which may be raised off of the toilet seat 142 to expose the toilet seat for use. A user then uses the toilet and closes the lid 140. Following use, the toilet is shifted to the first or stored position within the interior of the cabinet 50, such as is shown in FIG. 4. The door 90 is typically closed at this time. Also, the exterior door 30 is typically closed whenever the toilet is being shifted between the first and second positions. At times when it is desired to clean the toilet, the door 30 is opened, as shown in FIG. 5, and the support 130 is slid outwardly through the wall passageway 28 to a third position shown in FIG. 5. When in this third position, the toilet may be readily lifted off the support, if required, for cleaning purposes.

The toilet 54 may take forms other than a chemical toilet as shown in these figures. For example, toilet 54 may comprise a litter box for receiving animal waste.

The embodiment of the present invention shown in FIGS. 1–5 thus comprises an extremely convenient and sanitary truck waste system for a truck and one which minimally interferes with the use of the cab interior within the truck.

Having illustrated and described my invention with reference to a preferred embodiment, it should be apparent that this embodiment may be modified in arrangement and detail without departing from the principals of my invention. I claim all such modifications that fall within the spirit and scope of the following claims.

I claim:

1. A truck waste system comprising:
   a cab having a cab interior;
   a cabinet positioned within the cab interior and defining an interior cabinet space, the cabinet having a doorway communicating from the interior cabinet space to portions of the cab interior outside of the interior cabinet space, the cabinet also having a door which is operable to selectively open and close the doorway;
   a support slidable relative to the cabinet and adapted for sliding from a first position within the interior cabinet space and through the doorway to a second position;
   a portable toilet coupled to the support and slidable with the support from the first position wherein the toilet is positioned inside the interior cabinet space to a second position in which the toilet is shifted toward the cab interior and away from the interior cabinet space for use.

2. A truck waste system according to claim 1 including a seal operably coupled to the door to substantially hermetically seal the interior cabinet space from portions of the cab interior outside of the cabinet when the door closes the doorway.

3. A truck waste system according to claim 1 in which the cab has an exterior wall and a passageway communicating through the exterior wall between the interior cabinet space and the exterior of the cab, the cab also having a passageway door operable to selectively open and close the passageway, whereby opening the passageway door provides access to the interior cabinet space such that the toilet may be removed through the passageway for cleaning without the need for the toilet to be carried through the cab.

4. A truck waste system according to claim 3 in which the support is slidable relative to the cabinet through the passageway to a third position, wherein when the support is in the third position the toilet is shifted toward the exterior of the cab to facilitate removal of the toilet for cleaning.

5. A truck waste system according to claim 4 including first and second parallel spaced apart double acting slides coupled to the support and to at least one of the cab and the cabinet so as to guide the sliding of the support, and thereby the toilet, between the first, second and third positions.

6. A truck waste system according to claim 5 including a seal operable to substantially hermetically seal the doorway when the door is closed.

7. A truck waste system according to claim 1 in which the cab interior has a floor and wherein the cabinet comprises a seat projecting upwardly from the floor.

8. A truck waste system according to claim 1 including at least one slide operable to slidably couple the support to the cab or to the cabinet.

9. A truck waste system comprising:
   a cab having a cab interior and an exterior wall, a wall passageway being provided through the wall and communicating between the cab interior and the exterior of the cab, the cab including a passageway door operable to selectively close the wall passageway;
   a cabinet positioned within the cab and having a hollow interior, the wall passageway being positioned to communicate between the hollow interior of the cabinet and the exterior of the cab;
   a toilet support mounted to at least one of the cabinet and the cab such that the toilet support is shiftable from a first position at least partially inside the cabinet and through the wall passageway and passageway door to a second position at least partially outside the cab;
   a toilet having a waste storage area and a seat carried by the toilet support and shiftable with the toilet support from a first position within the cabinet and to a second position through the wall passageway and passageway door to facilitate removal of the toilet for cleaning; and
   the cabinet providing an interior storage space for the toilet and an access opening through which at least the seat of the toilet is accessible from the interior of the cab for use, and the access opening being sized and positioned such that the toilet including the seat and waste storage area is accessible through the wall passageway and passageway door from the exterior of the cab for cleaning.

10. A truck waste system comprising:
    a cab having a cab interior and an exterior wall, a wall passageway being provided through the exterior wall and communicating between the cab interior and the exterior of the cab, the cab including a passageway door operable to selectively close the wall passageway;
    a cabinet positioned within the cab and having a hollow interior, the wall passageway being positioned to communicate between the hollow interior of the cabinet and the exterior of the cab, the cabinet also having at least one upright wall portion between the hollow interior and the cab interior and spaced from the wall passageway;
    a toilet;
    the cabinet providing an interior storage space for the toilet and an access opening provided in said at least one upright wall portion the toilet being accessible through the access opening from the interior of the cab for use, whereby the toilet is shiftable through the access opening to a position within the interior of the cab for use and shiftable through the wall passageway for cleaning.

11. A truck waste system according to claim 10 including a door which closes the access opening when the door is in a first position and which opens the access opening when in a second position, the truck waste system also including a seal operable to substantially hermetically seal the access opening when the door is in the first position.

12. A truck waste system according to claim 10 including a slidable support carrying the toilet and slidable in first and second directions to selectively shift the toilet in the first direction for use and in the second direction for cleaning.

13. A truck waste system according to claim 12 including first and second parallel spaced apart slides coupled to the slidable support and to the cabinet or cab, the slides being slidable in the first and second directions to correspondingly shift the support and toilet in the first and second directions.

14. A truck waste system according to claim 9 in which the toilet is a portable chemical toilet.

15. A truck waste system comprising:
   a cab having a cab interior;
   a cabinet within the cab interior and having an opening communicating from the interior of the cabinet to portions of the cab interior outside of the cabinet;
   a toilet support mounted to at least one of the cabinet and the cab such that the toilet support is shiftable from a first position at least partially inside the cabinet and through the opening to a second position at least partially outside of the cabinet; and
   a toilet carried by the toilet support and shiftable with the toilet support through the opening from a first position within the cabinet to a second position sufficiently outside of the cabinet for use.

16. A truck waste system comprising:
   a cab having a cab interior;
   a cabinet within the cab interior and having an opening communicating from the interior of the cabinet to portions of the cab interior outside of the cabinet;
   a toilet support shiftable from a first position at least partially inside the cabinet and through the opening to a second position at least partially outside of the cabinet;
   a toilet carried by the toilet support and shiftable with the support through the opening from a first position within the cabinet to a second position sufficiently outside of the cabinet for use; and
   first and second slides slidably coupling the support to at least one of the cabinet and the cab for sliding between the first and second positions.

17. A truck waste system according to claim 16 in which the cab has a floor and an exterior wall, the cabinet being positioned to project upwardly from the floor and along the exterior wall.

18. A truck waste system according to claim 16 including a cabinet door operable to selectively open and close the cabinet opening and a seal adapted to seal the opening when the door is closed.

19. A truck waste system according to claim 16 wherein the toilet is for animals and comprises a litter box.

20. A truck waste system according to claim 17 in which the exterior wall includes a wall passageway communicating through the exterior wall between the exterior of the cab and the interior of the cabinet, the cabinet including a cab wall door selectively operable and positioned to open and close the cab wall passageway, the toilet support being shiftable from the first portion and through the wall passageway to a third position at least partially outside of the cab, whereby the toilet is accessible for cleaning when the toilet support is in the third position.

21. A truck waste system according to claim 10 wherein said at least one upright wall comprises a front wall of the cabinet which is opposite to the exterior wall and the wall passageway.

22. A truck waste system according to claim 21 including a support slidably mounted to at least one of the cabinet and cab and shiftable in a first direction at last partially through the access opening, the toilet being carried by the support and shiftable with the support in the first direction so as to be accessible for use, the support also being slidably mounted to at least one of the cabinet and cab so as to be shiftable in a second direction opposite to the first direction at least partially through the wall passageway, the toilet being carried by the support and shiftable with the support in the second direction so as to be accessible outside of the cab.

* * * * *